United States Patent [19]

Thorsrud

[11] Patent Number: 4,477,904
[45] Date of Patent: Oct. 16, 1984

[54] PARITY GENERATION/DETECTION LOGIC CIRCUIT FROM TRANSFER GATES

[75] Inventor: Lee T. Thorsrud, Saint Paul, Minn.

[73] Assignee: Sperry Corporation, New York, N.Y.

[21] Appl. No.: 355,804

[22] Filed: Mar. 8, 1982

[51] Int. Cl.³ .............................................. G06F 11/10
[52] U.S. Cl. ...................................... 371/49; 307/471
[58] Field of Search ...................... 371/49, 63; 307/471

[56] References Cited

U.S. PATENT DOCUMENTS 4,041,326  8/1977  Robinson ........................... 307/471
4,424,460  1/1984  Bertelson ........................... 307/471

Primary Examiner—Charles E. Atkinson

Attorney, Agent, or Firm—William C. Fuess; Kenneth T. Grace; Marshall M. Truex

[57] ABSTRACT

Each of the exclusive OR (XOR, or odd parity) and exclusive NOR (XNOR, or even parity) logical functions as between two signals input in both normal and inverted form is generated from separate logic circuits of two transfer gates implemented in complementary metal oxide semiconductor (CMOS) very large scale integrated circuit (VLSIC) technology. Replications of paired such XOR and XNOR logical circuits within a parity tree allow parity generation/detection as between $2^N$ signals input in both normal and inverted form in only N propagation stages of typically average 0.9 nanosecond delay each stage when implemented in 1¼ micron feature size CMOS VLSIC.

4 Claims, 11 Drawing Figures

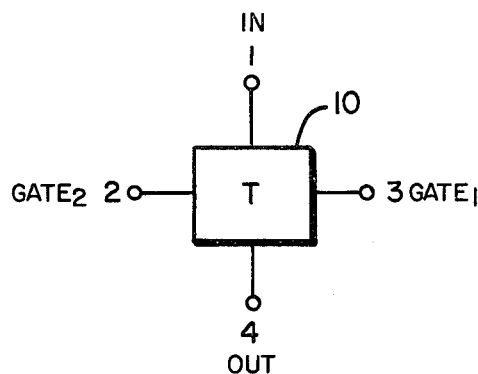
PRIOR ART
*Fig. 1a*
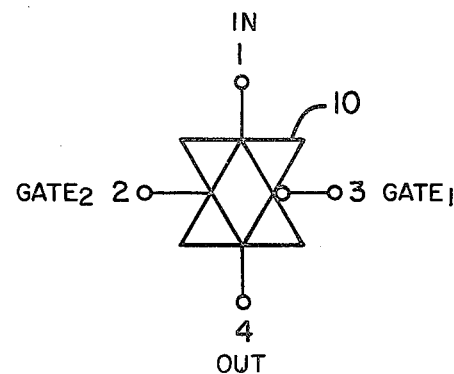
PRIOR ART
*Fig. 1b*
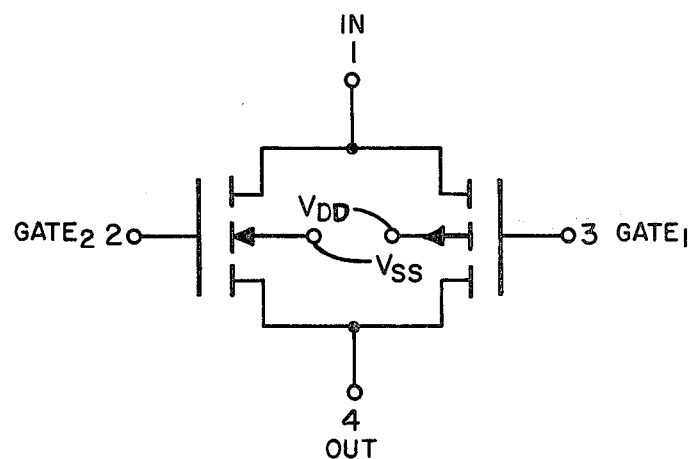
PRIOR ART
*Fig. 1c*
| 1 | 2 | 3 | 4 |
|---|---|---|---|
| H | H | L | H |
| L | H | L | L |
| H | L | H | HIGH Z |
| L | L | H | HIGH Z |
*Fig. 1d*

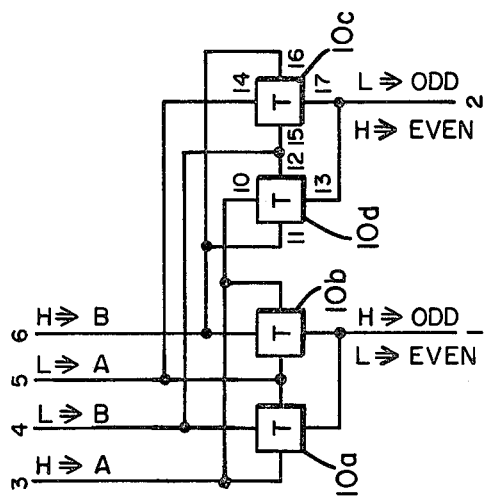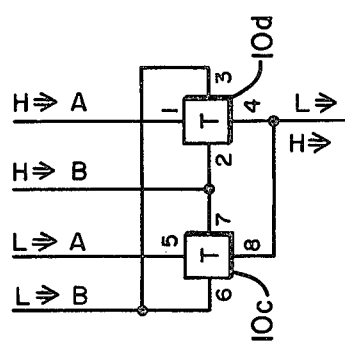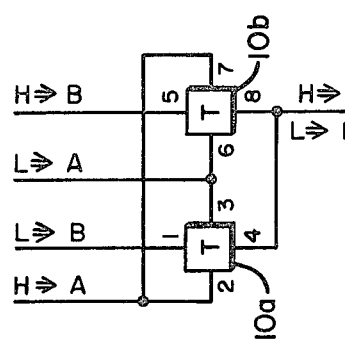

PARITY GENERATION/DETECTION LOGIC CIRCUIT FROM TRANSFER GATES

REFERENCE TO RELATED APPLICATIONS

The instant application discloses and claims subject matter disclosed in another patent application filed on the same day as the instant application, the other application having U.S. Ser. No. 356,051, entitled Versatile Interconnection Bus and filed in the name of Donald B. Bennett, et. al., both of which patent applications are assigned to the Sperry Corporation.

BACKGROUND OF THE INVENTION

The general area of the present invention is digital logic circuits for the generation and detection of parity and specific area of the present invention is a logic structure for high speed parity generation and detection utilizing Complementary Metal Oxide Semiconductor (CMOS) technology.

Examples of prior art parity generation/detection logic circuits are Texas Instruments, Inc. types SN54LS280, SN54S280, SN74LS280 and SN74S280. The functional block diagram for these 9 bit odd/even parity generators/checkers is shown at page 7-409 of the TTL Data Book for Design Engineers, Second Edition, Copyright 1976 Texas Instruments, Inc. These particular parity generation/detection circuits utilize seven levels of logic elements, with attendant delay. The processes within each of the seven levels are isolation (and inversion), inversion, ANDing in AND gates, collecting in OR gates, inversion, ANDing in AND gates, and collecting in OR gates. The number of levels is, of course, a function of the number of input bits (9 for the TI circuit). The important aspect to note, for purposes of the present invention, is the necessity of inversion between the various collector stages of each level.

Recognition of the problem of long operational times arising from the multiplicity of logic levels within prior art circuits is evidenced in the discussion of a Cascode Parity Circuit by E. L. Carter and H. T. Ward at Vol. 24, No. 3, August, 1981, IBM Technical Disclosure Bulletin. Such Cascode Parity Circuit, as constructed in emitter coupled logic (ECL) and limited by the adequacy of supply and signal voltages, is an attempt, for a small number of inputs, to generate or detect parity without the use of conventional unit logic blocks (e.g., AND-Invert logic as in the TI circuits) and at enhanced speeds.

SUMMARY OF THE INVENTION

The present invention utilizes a plurality of relatively new, but prior art, complementary metal oxide semiconductor (CMOS) very large scale integrated (VLSI) logic structures, called transfer gates, which are interconnected for parallel, simultaneous, generation of both the exclusive OR (XOR) and exclusive NOR (XNOR), or odd parity and even parity, logical function between two input signals. Replication of the basic XOR and XNOR logical structures in a parity logic tree structure allows the generation or detection of both odd parity and even parity as between $2^N$ signals, which are input in both their true and complemented form, in only N propagation levels, none of which levels performs an inversion.

Accordingly, the circuit of the present invention meets the dual objectives of high speed performance and economy in the substrate area that is utilized by a minimal number of compactly sized transfer gate logic structures from which it is constructed. The circuit of the present invention meets a third objective of evenly loading those logical elements that drive it while having a satisfactory output signal drive, a fan-out capability.

BRIEF DESCRIPTION OF THE DRAWINGS

FIG. 1a is an illustration of the symbol that represents the prior art CMOS transfer gate that is utilized by the present invention.

FIG. 1b is an illustration of an alternative symbol that is used in the literature of the prior art to also represent the same transfer gate as is shown in FIG. 1a.

FIG. 1c is an illustration of the electrical schematic of the prior art CMOS transfer gate that is represented by the symbol of FIG. 1a or the alternative symbol of FIG. 1b.

FIG. 1d is a truth table, alternatively called a transfer table, of the logical function performed by the CMOS transfer gate as illustrated in FIG. 1a through FIG. 1c.

FIG. 2a is an illustration of the exclusive OR, XOR, logic circuit as is constructed from transfer gates, and such as is a basic building block of the present invention.

FIG. 2b is a truth table for the XOR logical function as performed by the exclusive OR, XOR, logic circuit of FIG. 2a.

FIG. 3a is an illustration of the exclusive NOR, XNOR, logical circuit as is constructed from transfer gates, and such as is a basic building block of the present invention.

FIG. 3b is a truth table for the XNOR logical function as performed by the exclusive NOR, XNOR, logic circuit of FIG. 3a.

FIG. 4a is an illustration of the parity generation/parity detection circuit of the present invention such as simultaneously generates even and odd parity between two input signals A and B.

FIG. 4b is a repetition of the truth table for the XNOR logical function as was illustrated in FIG. 3b and such as now applies to XNOR logic circuit of FIG. 3a as is incorporated within the parity generation/detection circuit of FIG. 4a.

DESCRIPTION OF THE PREFERRED EMBODIMENT

Figure 5:
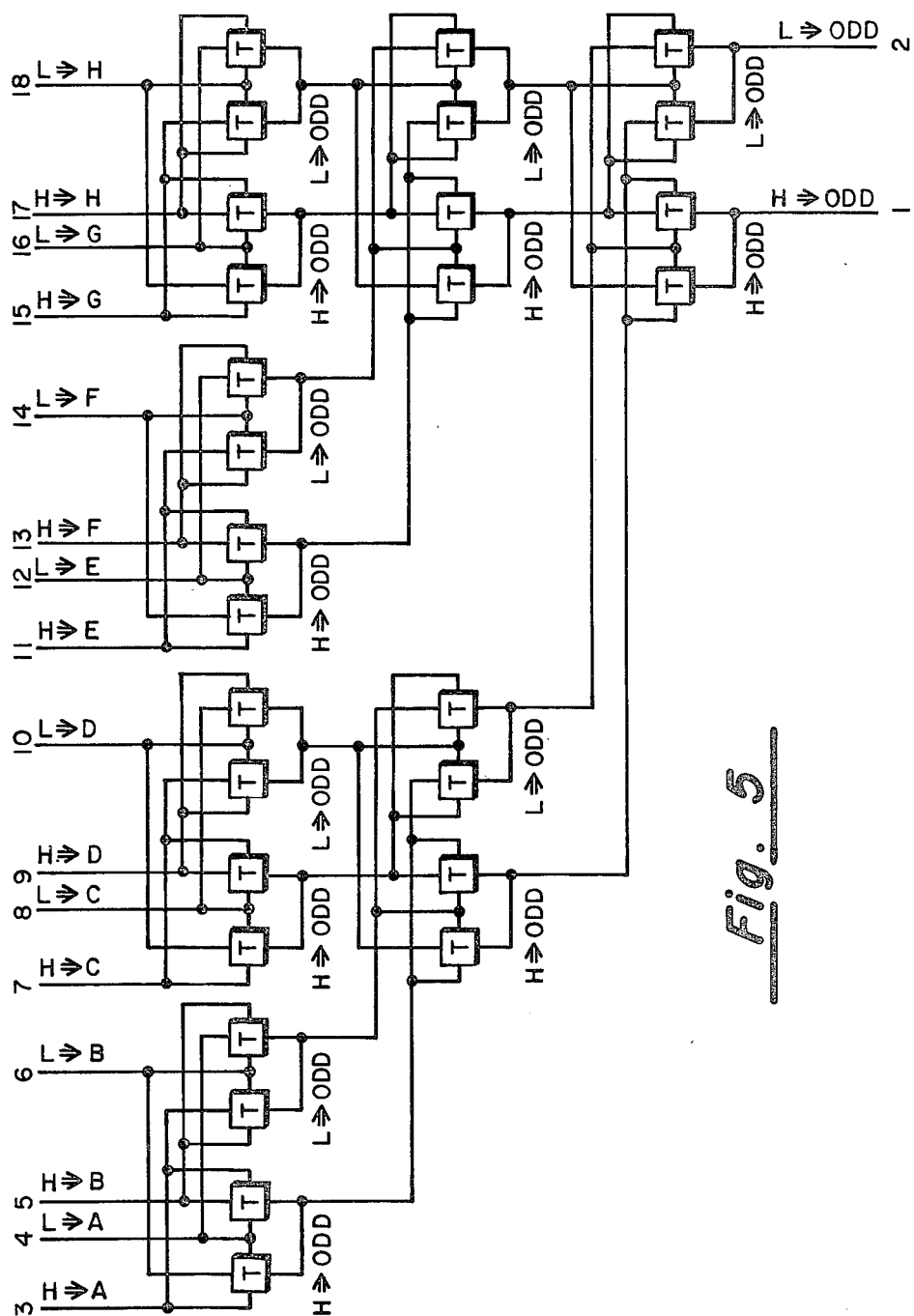
FIG. 5 shows the logic circuit of the invention replicated in a binary tree structure for the generation or detection of both odd and even parity between eight signals received in both normal and inverted form.

The present invention relates to a parity generation/detection circuit, or parity tree, that generates the parity—odd parity and even parity—of $2^N$ received input signals in a minimum number of levels of generation/detection logic. The parity circuit is constructed from plurality of 4-port transfer, or transmission, gates that are implemented in complementary metal oxide semiconductor (CMOS) technology. The transfer gate is a prior art device—see the text, Basic Integrated Circuit Engineering, D. Hamilton and W. Howard, © 1978 by McGraw Hill, Inc., with particular reference to pages 549, 550 and 566—being given by Hamilton and Howard the symbol shown in FIG. 1b. At the present time, neither this symbol of FIG. 1b nor any other symbol seems to be in universal accepted usage for this relatively new device. The present illustrations will utilize the symbol of FIG. 1a, which is amenable to automated generation in computer generated logic diagrams, and wherein the "T" will be found to have the meaning "transfer the input signal to the output port" if and when the two gating signals are at those logical levels which will be incorporated within the name of each such gating signal. The preferential utilization of the symbol of FIG. 1a is further explained in associated patent application U.S. Ser. No. 356,051.

The transfer gate is a digitally controlled analog switch useful in both digital and analog applications. As implemented in Complementary Metal Oxide Semiconductor (CMOS) technology, which can be very large scale integrated circuit (VLSI) technology, the transfer gate 10 of FIG. 1a or FIG. 1b has the electrical schematic shown in FIG. 1c. The voltage $V_{DD}$ is the supply voltage, nominally = 3 volts d.c., and the voltage $V_{SS}$ is the substrate voltage, nominally 0 volts d.c. This circuit performs a function similar to the well-known diode bridge. In the present application the transfer gate is utilized as a digital switch wherein a left gating signal applied to pin 2, signal $GATE_2$, will be the logical inverse of the right gating signal applied to pin 3, signal $GATE_1$. That is:

$$GATE_2 = \overline{GATE_1}$$

If the voltage of signal $GATE_1$ equals voltage $V_{SS}$, which will be called the logical Low (L) voltage, and the voltage of signal $GATE_2$ equals voltage $V_{DD}$, which will be called the logical High (H) voltage, then both transistors are turned on. The input signal, signal IN on pin 1, (which must be of voltage between $V_{DD}$ or High and $V_{SS}$ or Low) is then connected to the output port of pin 4 as signal OUT through the parallel on resistance of the channels of the two transistors. As signal IN varies in voltage from $V_{SS}$ (equals Low) to $V_{DD}$ (equals High), the P-channel device cuts off but the N-channel device turns on. Therefore, there is always a saturated transistor between the input port pin 1 and the output port pin 4. Moreover, no offset voltage exists when the output current is zero. This means that signal IN on input port pin 1, regardless of whether it should be High or Low (or anyplace in between) will be transferred to output port pin 4 as signal OUT. In other words:

if Signal $GATE_2$ = High (H)

meaning signal $GATE_1$ = Low (L)

then signal OUT = IN

If the voltage of signal $GATE_1$ equals $V_{DD}$ or High and the voltage of signal $GATE_2$ equals $V_{SS}$, or Low, then both transistors are off and the resistance between input port pin 1 and output port pin 4 will be of the order of $10^9$ ohms. In such a case the output port pin 4 presents no signal but merely high impedance, which is abbreviated HIGH Z. In other words:

if Signal $GATE_2$ = Low (L)

meaning signal $GATE_1$ = High (H)

then output port pin 4 = high impedance (HIGH Z)

FIG. 1d is a truth table illustrating the performance of the transfer gate logic element as shown in FIGS. 1a through 1c. The logical High (H) signal condition is associated with one binary state, nominally binary "1", while the logical Low (L) signal condition is associated with the other binary state, nominally binary "0". In the simplest possible terms, a logical Low (L) input signal (signal IN on pin 1) is gated through an N-channel transistor by a logical High (H) level gating signal (Signal $GATE_2$ on pin 2) applied to that transistor. A logical High (H) input signal (signal IN on pin 1) is gated through a P-channel transistor by a logical Low (L) level gating signal (signal $GATE_1$ on pin 3) to that transistor. If the N-channel transistor is turned off by a logical low (L) level gating signal (signal $GATE_2$ on pin 2) and the P-channel transistor is turned off by a logical High (H) level gating signal (signal $GATE_1$ on pin 3) then the transfer gate presents only high impedance (HIGH Z) at the output port (pin 4).

Transfer gates are very size efficient and fast VLSIC logic structures, the delay time being about 0.90 nanoseconds when implemented in CMOS VLSI of 1¼ micron feature size. Transfer gates represent a resistive load to driving circuits of approximately 0.07 picofarads for the gating signal and a varying capacitance for the input signal. Transfer gates supply no current drive. These loading and driving characteristics of the preferred embodiment transfer gate are exploited to advantage in the circuit of the present invention which is implemented with transfer gates.

Two transfer gates, having the configuration shown in FIGS. 1a through 1c, may be interconnected as shown in FIG. 2a to form a circuit for performing the logical function Exclusive OR (XOR) on two binary input signals H = A and H = B and their complements L = A and L = B. The XOR circuit includes two transfer gates 10a and 10b having their output pins 4 and 8 connected together in a wired-OR configuration. The signal L = B is applied to the input pin 1 of gate 10a while the signal H = B is applied to the input pin 5 of gate 10b. The signal H = A is applied to the gating input pin 2 of gate 10a and the gating input pin 7 of gate 10b. The signal L = A is applied to the gating input pins 3 and 6 of the gates 10a and 10b, respectively.

Since the transfer gates 10a and 10b have the circuit configuration shown in FIG. 1a through FIG. 1c, the circuit of FIG. 2a functions as follows. Only the left-side gating signal, or signal $GATE_2$, will be considered because the right-side gating signal, or signal $GATE_1$, will always be complementary for either transfer gate 10a or 10b as shown in FIG. 2a. If A and B are both true, the low level signal L = B at pin 1 is gated through the N-channel transistor in transfer gate 10a by the high level signal H = A at pin 2 and appears at pin 4. If A and B are both false, the low level signal H = B at pin 5 is gated through the N-channel transistor in gate 10b by the high level signal L = A at pin 6 and appears at pin 8. If A is true and B is false, the high level signal L = B at pin 1 is gated through the P-channel transistor in gate 10b by the low level signal L = A at pin 3 and appears at pin 4. If A is false and B is true, the high level signal H = B at pin 5 is gated through the P-channel transistor in gate 10b by the low level signal H = A at pin 7 and appears at pin 8. Meanwhile, if A is true, the low level signal L = A at pin 6 will cause transfer gate 10b to present only a high impedance (HIGH Z) at pin 8. If A is false, the low level signal H = A at pin 2 will cause transfer gate 10a to present only a high impedance (HIGH Z) at pin 4. When such a high impedance (HIGH Z) is wired-OR with a signal, whether of a high level (H) or a low level (L) then only the signal will be seen and the high impedance will have no effect upon signal transmission.

FIG. 2b is a truth table summarizing the operations of the circuit of FIG. 2a. Note that in the truth table the ORed output from pins 4 and 8 is logically high only when A≠B. This corresponds to the logical Exclusive OR function. Furthermore, the ORed output from pins 4 and 8 is low when A=B. Therefore, a high level output signal from pins 4 and 8 represents the odd parity of A and B while a low level output signal represents even parity. With respect to the wired-OR configuration, a high impedance exhibited at the output of one transfer gate does not effect the logic level of the output signal from the other transfer gate.

Two transfer gates, having the configuration shown in FIG. 1c, may be interconnected as shown in FIG. 3a to form a circuit for performing the logical function Exclusive NOR (XNOR) on two binary input signals H=A and H=B and their complements L=A and L=B. The XNOR circuit includes two transfer gates 10c and 10d having their output pins 4 and 8 connected together in a wired-OR configuration. The signal L=A is applied to the input pin 5 of gate 10c while the signal H=A is applied to the input pin 1 of gate 10d. The signal L=B is applied to the gating input pin 6 of gate 10c and the gating input pin 3 of gate 10d. The signal H=B is applied to the gating input pins 7 and 2 of the gates 10c and 10d, respectively. Since the transfer gates 10c and 10d have the circuit configuration shown in FIGS. 1a through 1c, the circuit of FIG. 3a functions as follows. If A and B are both true, the high level signal H=A at pin 1 is gated through the P-channel transistor in gate 10d by the Low level signal L=B at pin 2 and appears at pin 4. If A and B are both false, the high level signal L=A at pin 5 is gated through the P-channel transistor in gate 10c by the low level signal H=B at pin 7 and appears at pin 8. If A is true and B is false, the low level signal L=A at pin 5 is gated through the N-channel transistor in gate 10c by the high level signal L=B at pin 6 and appears at pin 8. If A is false and B is true then the low level signal H=A at pin 1 is gated through the N-channel transistor in gate 10d by the high level signal H=B at pin 2 and appears at pin 4. Meanwhile, if B is true then the low level signal L=B on pin 6 will cause transfer gate 10c to present only a high impedance at pin 8. If B is false, then the low level signal H=B on pin 2 will cause transfer gate 10d to present only a high impedance on pin 4.

FIG. 3b shows the truth table for the circuit of FIG. 3a. From this truth table it is seen that the wired-OR output from gates 10c and 10d is at the high level only when A=B. This corresponds to even parity.

An XOR 1 circuit as shown in FIG. 2a and an XNOR circuit as shown in FIG. 3a may be interconnected to form a two-input parity generator for producing signals representing the odd parity of the input signals and the complement of the odd parity (even parity). This arrangement is shown in FIG. 4a wherein the gates 10a and 10b correspond to the transfer gates 10a and 10b previously seen in the XOR circuit of FIG. 2a, and wherein the transfer gates 10c and 10d correspond to the transfer gates 10c and 10d previously seen in the XNOR circuit of FIG. 3a. A comparison of FIG. 4a with FIGS. 2a and 3a shows that the signals A and B and their complements are applied to the transfer gates 10a through 10d of FIG. 4a in exactly the same way they are applied to the transfer gates 10a and 10b as shown in FIG. 2a, and transfer gates 10c and 10d as shown in FIG. 3a. For odd parity, the signal H=ODD (L=EVEN) is logically High at output terminal 1 of FIG. 4a whereas for even parity (ODD) the signal L=ODD at output terminal 2 is logically High. It should be noted that the impedance seen by signal input to the source junction of a transfer gate is different from the impedance seen by a signal input to the gate junction of a transfer gate. If the utilization of each input signal of normal and complement form is traced within the circuit of FIG. 4a it will be seen that all are evenly loaded, each being used once as an input to a transfer gate and twice as an input for gating a transfer gate. The circuit of FIG. 4a is representative of only one stage of logical propagation delay or about 0.9 nanoseconds in VLSI CMOS technology. The truth table for the XNOR logical function such as was shown in FIG. 3b is replicated in FIG. 4b with reference to new pin numbers in order that it may be observed that simultaneous utilization of the two input signals received in both normal and complemented form for the generation of the XOR, or ODD parity, logical function in no ways interferes with the simultaneous generation in even time of the XNOR, or EVEN parity, logical function from the same signals.

The replication of the basic parity generation/detection circuit of the present invention as is shown in FIG. 4a for the detection/generation of parity between eight signals received in both normal and inverted form is shown in FIG. 5. The construction of a binary tree array circuit structure from replications of the combined NOR and XNOR circuits may be seen to formulate the even and odd parity between up to $2^N$ signals received in both normal and inverted form (N=3 for the circuit of FIG. 5) in N propagation stages or levels (3 in the circuit of FIG. 5). Each level, or propagation stage, is composed of parallel combined NOR and XNOR circuits which are jointly replicated $N-X$ times within each stage from the topmost, entrance level, stage to the last stage, or root node stage, as X varies by integer values from 1 to N. In other words, the entrance level stage (which accepts $2^N$ signals received in both normal and inverted form) will comprise $2^{N-1}$ parallel replications of the combined NOR and XNOR circuits ($2^{3-1}=2^2=4$ in FIG. 5a) while the last stage will comprise $2^{N-N}$ or $2^0$ or 1 such replication of the combined NOR and XNOR circuits. Of course, any number of input signals not in excess of $2^N$ total input signals may be connected as logical zeros. The signals are accepted two at a time into each of the parallel replications. In other words, the $2^N$ signals received at the topmost, entrance level, stage are received two at a time into the $2^{N-1}$ parallel replications of the combined NOR and XNOR circuits within that stage. Each stage will produce howsoever many odd parity output signals plus howsoever many even parity output signals as there are replications of the combined NOR and XNOR circuits within that stage. In other words, $2^{N-X}=2^{3-1}=4$ odd parity signals and $2^{N-X}=2^{3-1}=4$ even parity signals will be transmitted from the topmost entrance level stage of $2^{N-X}=2^{3-1}=4$ replicated combined NOR and XNOR circuits and will be received at the next lower stage of $2^{N-X}=2^{3-2}=2$ replications of the combined NOR and XNOR circuits. The manner of interconnection and signal utilization between successive stages is completely consistent and uniform, although the wire routing of FIG. 5 may have to be carefully studied in order to perceive that this is so. In other words, each parity signal as is compositely formed of two other signals is utilized in that same branch of the binary tree structure within which such two other signals arose.

The final signals output from the root node stage are both the odd parity and the even parity derived from all the input signals. The entire parity generation/detection is performed without inverters or any other element other than transfer gates. There are no loading and/or fanout limitations in the structure and the design is extendable to indefinitely wide input words occupying indefinitely many signal lines. Normally intended to be operated as cascaded logics, intermediary register holding and timed gating could be employed between stages, or after some large number of cascaded stages, if improved internal synchronization is desired.

This generation of parity through transfer gates performing the XOR and XNOR logical functions, avoids the need for logical level inverters between stages. Therefore the eight signal input parity generator/detector shown in FIG. 5 requires only three logical stages. Each of these stages is very economical in VLSIC area, a transfer gate being the equivalent of only four logical junctions when implemented in CMOS VLSIC. Furthermore, transfer gates are individually faster than logic elements. Therefore the present implementation of a parity generator/detection logic circuit from transfer gates is both economical of implementation in VLSIC and very fast.

What is claimed is:

1. A circuit apparatus for the generation of the logical parity resultant between two binary stated (0 or 1) signals (A and B) each of which is received by said circuit apparatus in both normal (A, B) and inverted ($\overline{A}$, $\overline{B}$) form, said parity generating circuit comprising:

first transfer gate means
for receiving said inverted form of said second ($\overline{B}$), said normal form of said first signal (A), and said inverted form of said first signal ($\overline{A}$), and
for gating said inverted form of said second signal ($\overline{B}$) to an output port of said first transfer gate means only when said first binary stated signal (A) is of binary state 1, else
for presenting high impedance on said output port of said first transfer gate means if said first binary stated signal (A) is not of binary state 1;
second transfer gate means
for receiving said normal form of said second signal (B), said inverted form of said first signal ($\overline{A}$), and said normal form of said first signal (A), and
for gating said normal form of said second signal (B) to an output port of said second transfer gate means only when said first binary stated signal (A) is of binary state 0, else
for presenting high impedance on said output port of said second transfer gate means if said first binary stated signal (A) is not of binary state 0; and
wired-OR interconnection means for electrically connecting said output port of said first transfer gate means and said output port of said second transfer gate means;
whereby the logical function produced at said output port of said first transfer gate means electrically connected to said output port of said second transfer gate means is the exclusive OR, or odd parity in normal form (ODD), or even parity in inverted form ($\overline{EVEN}$) between said two binary stated signals (A and B).

2. A circuit apparatus for the generation of the logical parity resultant between two binary (0 or 1) signals (A and B) each of which is received by said circuit apparatus in both normal (A, B) and inverted ($\overline{A}$, $\overline{B}$) form, said parity generating circuit comprising:

first transfer gate means
for receiving said normal form of said first signal (A), said normal form of said second signal (B), and said inverted form of said second signal ($\overline{B}$), and
for gating said normal form of said first signal (A) to an output port of said first transfer gate means only when said second binary stated signal (B) is of binary state 1, else
for presenting high impedance on said output port of said first transfer gate means if said second binary stated signal (B) is not of binary state 1;
second transfer gate means
for receiving said inverted form of said first signal ($\overline{A}$), said inverted form of said second signal ($\overline{B}$), and said normal form of said second signal (B), and
for gating said inverted form of said first signal ($\overline{A}$) to an output port of said second transfer gate means only when said second binary stated signal (B) is of binary state 0, else
for presenting high impedance on said output port of said second transfer gate means if said second binary stated signal (B) is not of binary state 0; and
wired-OR interconnection means for electrically connecting said output port of said first transfer gate means and said output port of said second transfer gate means;
whereby the logical function produced at said output port of said first transfer gate means electrically connected to said output port of said second transfer gate means is the exclusive NOR, or even parity in normal form (EVEN), or odd parity in inverted form ($\overline{ODD}$) between said two binary stated signals (A and B).

3. In a digital logics circuit wherein a transfer gate will transfer on input signal to an output port when a first gating signal is of a logically High level and a second gating signal is of a logically Low level but will elsewise present high impedance on said output port, a parity generation circuit apparatus for simultaneously producing in parallel both an odd parity signal (ODD) and an even parity signal (EVEN) as respectively reflect logical odd and logical even parity between two binary-valued quantities received by said parity generation circuit apparatus as first (A) and second (B) binary-stated (High or Low) signals each of which is received in both normal (A, B) and inverted ($\overline{A}$, $\overline{B}$) form, said parity generation circuit apparatus comprising:

a logical exclusive OR circuit comprising:
a first transfer gate receiving as an input signal said inverted form of said second signal ($\overline{B}$), receiving as a first gating signal said normal form of said first signal (A), and receiving as a second gating signal said inverted form of said first signal ($\overline{A}$); with an output port wire-OR'ed common to the output port of
a second transfer gate receiving as an input signal said normal form of said second signal (B), receiving as a first gating signal said inverted form of said first signal ($\overline{A}$), and receiving as a second gating signal said normal form of said first signal (A);

in parallel with a logical exclusive NOR circuit comprising:
   a third transfer gate receiving as an input signal said normal form of said first signal (A), receiving as a first gating signal said normal form of said second signal (B), and receiving as a second gating signal said inverted form of said second signal ($\overline{B}$); with an output port wire-OR'ed common to the output port of
   a fourth transfer gate receiving as an input signal said inverted form of said first signal ($\overline{A}$), receiving as a first gating signal said inverted form of said second signal ($\overline{B}$), and receiving as a second gating signal said normal form of said second signal (B);

whereby the signal produced at the output port of said first transfer gate wire-OR'ed common to the output port of said second transfer gate is the odd parity signal in normal form (ODD) or the even parity signal in inverted form ($\overline{\text{EVEN}}$) as reflect the exclusive OR, or normal odd parity, logical function between said two binary-valued quantities;

whereby the signal produced at the output port of said third transfer gate wire-OR'ed common to the output of said fourth transfer gate is the even parity signal in normal form (EVEN) or the odd parity signal in inverted form ($\overline{\text{ODD}}$) as reflect the exclusive NOR, or even parity, logical function between said two binary-valued quantities.

4. A digital logic circuit apparatus for the generation in N propogation delay times as arise from electrical propogation through N linearly sequential logical stages either the logical odd parity, or the logical even parity, or both, between $2^N$ binary stated signals received by said digital logic circuit apparatus in both normal and inverted form, said circuit apparatus for the generation of parity between $2^N$ binary stated signals in N propagation stages incurring N propagation delay times comprising:

a multiplicity of logic means connected in a binary tree structured interconnective array, each said logic means for simultaneously generating in parallel during one propagation time the exclusive OR, or logical odd parity, and the exclusive NOR, or logical even parity, signals as between two signals received by each said logic means in both normal and inverted form, each said logic means for simultaneously generating even and odd parity signals comprising:
   a first and a second transfer gate for receiving said normal and inverted forms of both said two signals and for combinatorially generating said odd parity signal at the wired OR interconnection of the outputs of said first and second transfer gates;
   a third and a fourth transfer gate for receiving said normal and inverted forms of both said two signals and for combinationally generating said even parity signal at the wired-OR interconnection of the outputs of said third and fourth transfer gates; and wherein said binary tree structured interconnective array of said multiplicity of logic means comprises:
   N stages, or levels, each stage comprising $2^{N-X}$ said logic means where X varies from N, at the root node stage of said binary tree structured interconnective array, to 1, at the topmost stage, in steps of $-1$; with
   said $2^N$ binary stated signals received in both the normal and inverted forms two at a time into the $2^{N-1}$ logic means of said topmost stage; while
   $2^{N-X}$ said odd parity signals and $2^{N-x}$ even parity signals as are generated in each said N stages of $2^{N-X}$ logic means each are received two at a time into the $2^{N-X-1}$ logics means of the next successive lower stage as X varies from 1, at the topmost stage, to N, at the root node stage, in steps of $+1$; until when X=N the $2^{N-X}=2^{N-N}=1$ said odd parity and the $2^{N-X}=2^{N-N}=1$ said even parity signal as are generated at said root node stage of $2^{N-X}=2^{N-N}=1$ said logic means are respectively said logical odd parity and said logical even parity between said $2^N$ binary stated signals received in both the normal and inverted forms at said topmost stage.

* * * * *